United States Patent [19]

Priest et al.

[11] 4,049,484

[45] Sept. 20, 1977

[54] VACUUM TRANSFER HEAD AND METHOD OF USE

[75] Inventors: John Garrick Priest; Robert Barry Tooth, both of London, England

[73] Assignee: Johnson, Matthey & Co., Limited, London, England

[21] Appl. No.: 611,245

[22] Filed: Sept. 8, 1975

[30] Foreign Application Priority Data

Sept. 13, 1974 United Kingdom ............... 40022/74

[51] Int. Cl.[2] ........................ B29C 17/00; B25B 11/00; A47B 97/00

[52] U.S. Cl. ........................................ 156/285; 269/21; 271/90; 294/64 R; 156/570

[58] Field of Search ............... 156/285, 570, 571, 572; 271/107, 194, 90; 294/64 R; 269/21

[56] References Cited

U.S. PATENT DOCUMENTS

| | | | |
|---|---|---|---|
| 2,247,623 | 7/1941 | Von Hofe | 156/572 |
| 3,138,508 | 6/1964 | Fairest | 156/285 |
| 3,377,096 | 4/1968 | Wood | 294/64 R |
| 3,926,710 | 12/1975 | Weingrad | 156/572 |

*Primary Examiner*—Douglas J. Drummond
*Attorney, Agent, or Firm*—Cushman, Darby & Cushman

[57] ABSTRACT

This invention relates to the handling of transfers or decalcomanias. In particular the invention is concerned with a vacuum head for use in conjunction with the apparatus described and claimed in our U.S. patent application Ser. No. 349,188, and comprises a device for handling transfers comprising a hollow body having a perforate or porous face, a layer of perforate or porous resilient material applied to the said face and a pipe connection for connecting the device to a source of suction.

6 Claims, 4 Drawing Figures

VACUUM TRANSFER HEAD AND METHOD OF USE

This invention relates to the handling of transfers or decalcomanias and, more particularly, to a vacuum head therefor.

In conventional transfer-application machines, various methods may be used for removing a transfer from a stack of the same, supporting the transfer whilst activation is carried out and, finally, applying the transfer to the article to be decorated. Methods of activation may include exposure to water or to some other suitable solvent in the case of water-release or solvent-release transfers, to heated ware in the case of heat-release transfers, or to a source of heat in the case of heat-activated transfers.

The latter method of activation — that is to say, exposure of the transfer to a source of heat — is particularly suited to transfers wherein the ink forming the design layer is a so-called "heat activatable ink", as disclosed in South African Pat. No. 73/1173, Argentine Pat. No. 200,486, Italian pat, No. 979,414, and U.S. application Ser. No. 499,043. As explained therein, a printing ink remains tack-free until activated by heat and, after such activation, retains its tackiness for a predetermined period of time. One advantage of a transfer incorporating a design layer of such an ink is that the ware to which the transfer is to be applied is not pre-heated.

One method which may be used for removing from a stack a heat-activatable transfer, of the type described above, and supporting the transfer prior to its application to the ware, over a source of heat, is described in Argentine Pat. No. 200,260, Canadian Pat. No. 967,118, Italian Patent 983,802 and U.S. application Ser. No. 571,745. SAid method involves a transfer-application machine, in which suction tubes withdraw a transfer from the top of a stack and position it in a transfer-supporting frame which then holds the transfer over a source of heat prior to application to the ware. This procedure, however, depends on a complicated sequence of operations and requires several pieces of equipment, viz. suction tubes, transfer-supporting frame and application means. A disadvantage of such a machine is, therefore, appart from its size and capital cost, the increased possibility of mechanical failure or of inaccurate positioning of the transfer on the ware.

It is desirable to remove a transfer from a stack of transfers and adhere it to ware, having exposed the transfer to a suitable activation source, in essentially one operation.

One method of achieving this in to remove the transfer from a stack of transfers, using a vacuum head, retain the transfer on the vacuum head during exposure to an activation source and to release the activated transfer from the vacuum head when the transfer is in contact with an article.

To this end, the vacuum head may be mounted for movement between the stack of transfers and the station at which the activated transfer is contacted with the ware. The activation source may be positioned at some convenient location along the linear path of the vacuum head.

The ware, meanwhile, may be carried on a ware-supporting platform which is movable between a ware loading/unloading station and the station at which the activated transfer is contacted with the ware. The vacuum head, carrying the activated transfer, may be arranged to arrive at the contacting station either simultaneously with or immediately after the arrival of the ware at the same station in such a way that transferring is effected. The ware supporting platform, now loaded with the ware carrying the transfer, may then return to the ware loading/unloading station and the vacuum head may return to the stack of transfers.

Apparatus for putting the above method into effect should operate satisfactorily when used with heat-activatable transfers, especially those wherein the ink forming the design layer is a so-called "heat activatable ink".

Accordingly, the vacuum head we propose to use for handling transfers, for example in the method described above, is faced with a layer of perforate or porous material, for example, foam rubber. This layer of perforate or porous material acts to separate the transfer from the vacuum head and thereby assist in evenly distributing the vacuum over the entire area of the transfer.

The vacuum head may be formed from any suitable material but is preferably formed from metal.

For transfers incorporating a "heat-activatable ink", it is desirable to provide heat-insulation in order to avoid unnecessary heat loss from the transfer to the head. Accordingly, the perforate or porous material may be a heat insulating material.

In one embodiment, which we consider particularly suitable for such transfers, a layer of heat insulating material is provided beneath the layer of porous material.

The reasons for the incorporation of the layers of heat-insulating material and foam rubber are as follows. If a vacuum head, comprising a metal box with a plurality of holes drilled through one face, together with means for reducing the pressure within the box to create a differential air pressure between the two sides of a transfer applied thereto, it used to remove a transfer from a stack and to expose it to an activating source of heat, the metal tends to conduct heat away from the transfer, including those areas of the transfer which are over the holes so that the activation time is prolonged. It is impracticable, in order to overcome this problem, simply to increase the temperature of the heat source, as this is uneconomic and tends to cause the transfers to shrink, curl and even break away from the vacuum head. The layer of insulating material is introduced to avoid this and has holes which correspond with those in the box when the insulating material and the metal box are bonded together. The effect of the insulating material is to reduce heat loss by conduction.

It is preferred to use either a porous insulating material or both a layer of insulating material and a layer of porous material, since a plain layer of insulating material gives rise to unevenness in activation, small areas of ink corresponding to the holes in the insulating material being activated more than the other areas. The porous material has the effect of evenly distributing the vacuum so that a transfer can be held over a source of heat without uneven activation taking place.

In practice, it is desirable that the vacuum head of the invention should simply contact but not compress the stack of transfers before vacuum is applied to cause the topmost transfer to adhere to the head. This is because the ink film forming the design layer on the side of the transfer remote from the vacuum head is relatively thick compared with the thickness of the transfer backing paper; the effect of this, especially when duplicated throughout a stack of transfers under pressure from the physical contact of the vacuum head, causes non-even contact between the head and the transfer which could result in some misalignment or distortion of the transfer. Alternatively, when using a vacuum head according to the invention, it may be desirable to leave a "snap distance" of, say, one millimetre, between the porous material and the topmost transfer of the stack. This transfer is then drawn up from the stack across the "snap distance" by the vacuum and adheres evenly to the foam rubber layer of the head.

Using a vacuum head according to the invention and having removed the topmost transfer from a stack, the vacuum should, in the case of a compressible porous material, be reduced to prevent complete compression of the porous material (e.g. foam rubber) and thereby reduce heat losses. The vacuum required to hold a transfer to the head without distortion whilst the operations of activation and application to the ware are carried out is lower than the vacuum required to withdraw to transfer from a stack across the "snap distance". For instance, a vacuum equivalent to about one inch of mercury is generally quite sufficient to cause a transfer to remain in adherance to the vacuum head once the transfer has been removed from the stack.

A typical vacuum head according to the invention is shown by way of example in FIG. 1 of the accompanying drawings. The vacuum head comprises a metal box A having a perforated metal or other suitable base B and a pipe C for connection to a source of vacuum not shown. The base B is of such a size and shape to match the dimensions of the transfers to be applied. The base B carries a layer D of polyurethane foam rubber of about 2 mm. thickness and a layer E of heat-insulating material, such as a layer of polyurethane synthetic rubber. The thickness of this layer is determined by the degree of heat insulation required, but a thickness of from 6 mm. to 12 mm. is generally considered to be satisfactory. A typical thickness for polyurethane rubber is 9 mm., but should an alternative heat-insulating material be used, the thickness of the layer would depend on the heat-conducting properties of that material.

Examples of suitable heat-insulating materials are — apart from aynthetic rubber — natural rubber, blotting paper, loose-textured fabrics, felt and cork. Indeed, any material exhibiting the desired heat-insulating properties may be used, but it is desirable that it should be somewhat resilient in nature, although firm, so that no damage will be done to the transfers.

According to the type of transfer-application machine that is used in conjunction with a vacuum head according to the invention, the actual application step of the sequence could take one or several forms. Either the vacuum head could be used to "tack down" an activated transfer evenly to the ware and a separate pressure head used to apply final pressure evenly to the tacked-down transfer, or the vacuum head itself could be used to apply final pressure, thus eliminating the tack-down stage. According to both of these methods, the transfer backing paper is blown off, or otherwise removed, from the ware after the transfer has been subjected to final pressure. According to yet another method of transfer application, the vacuum head of the invention could be used to tack down a transfer, after which stage the head is temporarily withdrawn to allow the backing paper to be removed. The head is then reapplied to the transfer to bring it finally into contact with the ware.

Although the vacuum head of the invention has been designed primarily for use with heat-activatable transfers, it is by no means limited to these. It would be within the scope of the invention, for instance, to leave out the intermediate heat-insulating layer, should this be necessary for the application of other forms of transfers, for instance, solvent-release or pressure-sensitive transfers. However, even in such cases, it may be considered desirable to retain this intermediate layer because of its firm, yet resilient, properties.

As indicated previously, the vacuum head according to the present invention is particularly suitable for use in conjunction with the method described in co-pending U.S. application Ser. No. 571,745 and for completeness there now follows a description thereof with reference to FIG. 2 of the accompanying drawings.

Figure 1:
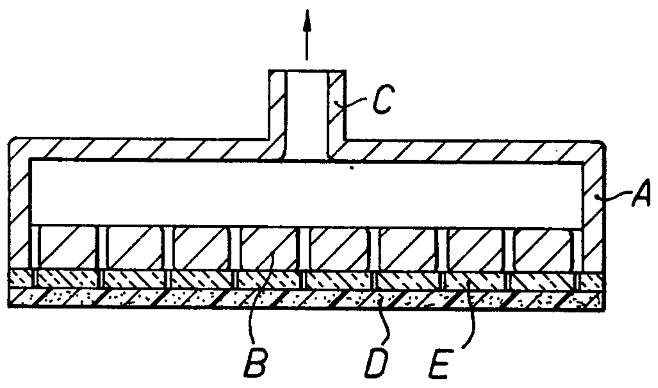
FIG. 1 is a cross-sectional view of a vacuum head.
Figure 2:
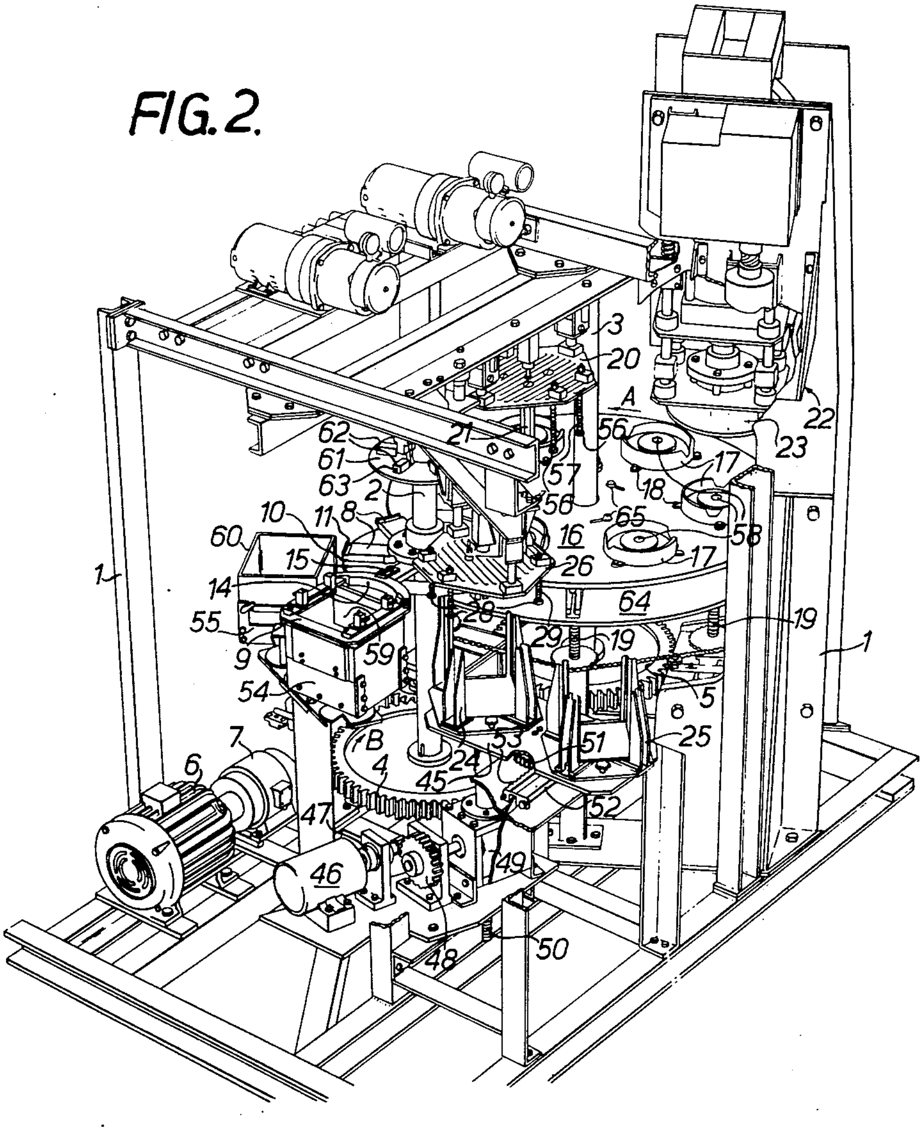
FIG. 2 is a part sectional isometric view of a transfer applying machine.

Referring now to FIG. 2 (a part sectional isometric view of a transfer applying machine) it will be seen that the machine consists of a rigid girder framework generally designated 1, in which are mounted in self-aligning flanged transmission bearings (not shown) vertical shafts 2 and 3. On shafts 2 and 3 are mounted 66-tooth gear wheels 4 and 5 which are meshed with a pair of idler gear wheels so that when shaft 3 is driven in an anticlockwise direction viewed from above, shaft 2 is drived at the same speed in a clockwise direction. The machine is driven by an electric motor 6 via a clutch unit 7 and a 10–1 reduction worm gear box (not shown) from which a manifold cam indexing gear box (not shown) is driven by a belt (not shown). On the output shaft of the indexing gear box is mounted a 33-tooth gear wheel (not shown) which meshes with gear wheel 5, the whole being arranged so that when the motor 6 is running and the clutch 7 suitably engaged and disengaged, shafts 2 and 3 are indexed in 60° steps. At the end of each indexing movement shafts 2 and 3 are each locked in position by means of a steel tooth which firmly engages the teeth of the gear wheels 4 and 5 respectively.

Mounted on shaft 2 is an array of six arms 8 arranged at 60° intervals, although only three of the arms are visible in the figure. At the end of each arm are arcuate grooves 10, 11 which accept the opposed edges of slot-defining walls 12, 13 of an arcuate C-section girder 14 secured to the frame of a transfer holder 9. The edges of the slot-defining walls of the C-section girder 14 are a smooth fit in the grooves 10, 11 of the arm 8 and this permits the transfer holder 9 to be oriented in relation to the axis of the arm 8. As shown in FIG. 2, the girder 14 and hence the transfer holder 9 are locked in position on the arm 8 by means of a clamping bar 15. One transfer holder 9 is shown mounted on one only of the arms 8 in FIG. 2, but in practice, such a transfer holder is secured to the end of each of the six arms 8.

A circular table 16 is secured to a further circular table 64 which is then secured to shaft 3. Table 16 carries on its upper surface six holders 17 designed to hold articles to which transfer designs are to be applied. The holders are secured to the table 16 by means of bolts 18. The holders shown in FIG. 2 were designed to accept 7 inch diameter tea plates and for different articles, other holders would have to be fitted. The table 64 and the associated table 16 are capable of being raised and lowered twelve inches by means of screw jacks 19. In one embodiment of the invention, table 16 consists of an aluminium alloy disc 42 inches in diameter and 0.5 inch thick sandwiched between two discs of 18 gauge toughened stainless steel.

In operation the table 16 carrying the holders 17 is indexed in 60° steps in the direction of the arrow A so that the holders located in positions 2', 3', 4', 5' and 6' and moved successively into position 1'.

At the same time, the arms 8 are indexed in 60° steps in the direction of arrow B so that the transfer holders 9 secured to the ends of the arms are moved successively from positions 8', 9', 10', 11' and 12' into position 7'.

Further, the table 16 may be oriented ± 15° in relation to the index positions of table 64 by means of a vernier device (not shown) to enable a chosen part of each article holder 17 and hence of each article, when the holders are loaded, to be located beneath the transfer holder when the table 16 and the arms 8 are stationary in successive index positions. The table 16 is locked in position in relation to table 64 by means of nuts 65.

When the machine is in normal operation, a transfer holder in position 7' will be holding a transfer stationary and immediately above the article — say a 7 inch diameter tea plate — to which the transfer design is to be applied. The plate will have been loaded at position 3'; the transfer will have been loaded into the holder 9 at position 11' and its adhesive activated at positions 10' and 9'. Both of these latter two positions are automatic and will be explained later.

At position 7' a transfer applying frame 20 (see FIGS. 3 and 4) carrying a tack-down plunger 20' and four rods 21 to which is secured an annular suction gallery 21' is displaced downwards so that the gallery 21' is moved through the appropriate transfer holder 9. During its passage downwards, the lower surface of the gallery makes contact with and grasps the back of the transfer by suction through a series of holes in the base of the gallery. The transfer is then released from the holder 9 (in a manner to be explained) and, securely held to the base of the gallery, is moved downwards until it is within about 1/16 inch of the ware. At this point the rubber pad 66 on bracket 65 makes contact with bars 67 fixed to the transfer holding frame and the downward movement of the suction gallery 21' is arrested. The plunger 20' carries on for another ⅛ inch so that the rubber pad 68 secured to its lower end presses part of the transfer on to the ware and "tacks" it down there, that is, causes it to adhere to the ware at that point. Just before that part of the transfer which is in contact with the pad 68 is pressed on to the ware, a microswitch (not shown) is operated and the vacuum applied at 69 is broken so as to release the transfer from the suction holes in the gallery 21' and the transfer applying frame 20 is then raised to its original position.

The whole process is then repeated when transfer and ware holders have been indexed from positions 8' and 2' into position 7' and 1' and so on. The ware to which the transfer is tacked in position 1' moves successively into positions 6' and 5' and in position 5' (6' is spare) the transfer is firmly pressed on to the ware by means of a flexible pressure pad 23 secured to the end of a plunger arm in a pressure pad assembly 22 so that the transfer design is firmly secured to the ware. The pressure pad 23 is raised; the backing sheet of the transfer is removed by a blast of high pressure air from tubes (not shown) aligned at a small angle to the surface of the ware and collected by a vacuum suction device (not shown). Following this the plate in its holder and carrying the freshly applied transfer design is indexed into position 4' where it is removed from the holder.

Figure 3:
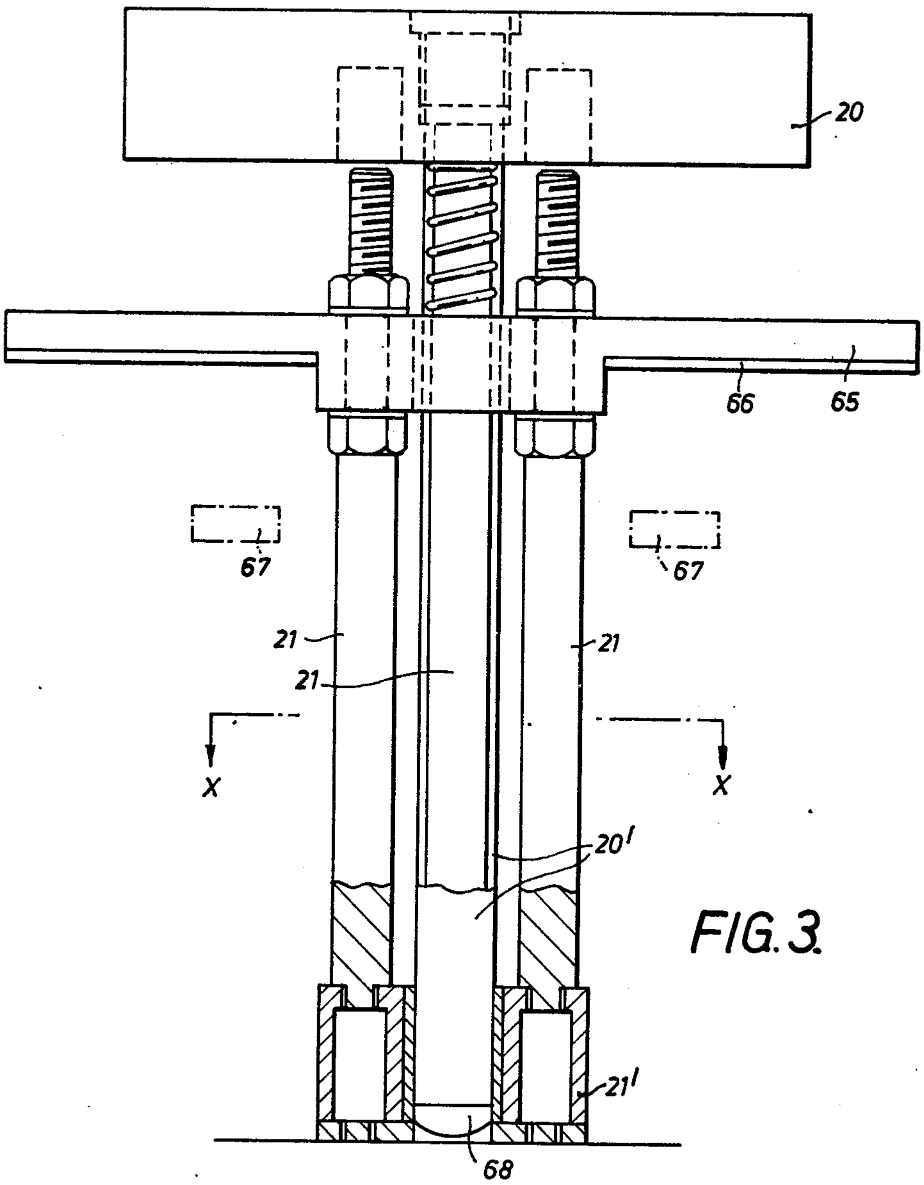
FIG. 3 is a part sectional, cross-section view of the transfer applying frame.
Figure 4:
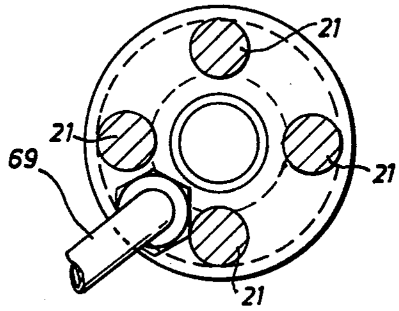
FIG. 4 is a cross-sectional view taken on line XX of FIG. 3.

It will be appreciated from the description of FIGS. 2, 3 and 4 that the vacuum head of the present invention replaces the pad 68 and is connected to the suction or vacuum gallery 21'.

What we claim is:

1. A vacuum head for handling transfers comprising a hollow body having a perforate or porous face, a pipe connection for connecting the hollow body to a source of suction, a layer of perforate or porous heat insulating material applied to the said face and a layer of porous resilient foam material applied to the layer of heat insulating material.

2. A vacuum head according to claim 1, wherein the said resilient material possesses heat insulating characteristics.

3. A vacuum head according to claim 2, wherein the said resilient material is a polyurethane foam rubber.

4. A vacuum head according to claim 3, wherein the layer of heat insulating material is made from synthetic rubber, natural rubber, blotting paper, loose textured fabrics, felt or cork.

5. A vacuum head according to claim 1 wherein said layer of perforate or porous heat insulating material is resilient material.

6. A method of handling transfers comprising the steps of bringing a vacuum head into contact with the transfers, the vacuum head comprising a hollow body having a perforate or porous face and a pipe connection for connecting the hollowing body to a source of suction, a first layer of perforate or porous heat insulating and resilient material applied to said face and a second layer of porous resilient foam material applied to the first layer, picking up a transfer with said vacuum head by bringing the second layer into contact with the transfer and applying suction from said source to said hollow body, activating said transfer by exposing it to an external source of heat, and releasing said transfer onto an article by bringing said head into contact with the article and terminating the application of suction to said hollow body.

* * * * *